Aug. 21, 1951 L. G. DUFILHO 2,565,360
METHOD FOR NITRIDING
Filed Dec. 15, 1947

Inventor
LEON G. DUFILHO,

By Fisher + Christen, Attorneys.

Patented Aug. 21, 1951

2,565,360

UNITED STATES PATENT OFFICE 2,565,360

METHOD FOR NITRIDING

Leon G. Dufilho, Shreveport, La.

Application December 15, 1947, Serial No. 791,872

2 Claims. (Cl. 148—10)

This invention is a method of nitriding metals, particularly ferrous-base metals, that may contain various other metals in relatively small amounts.

Without restricting the invention to any particular type of iron or iron or steel alloy, it is useful with an iron containing carbon, manganese, silicon and chromium. In addition to these metals, there may also be aluminium and molybdenum in the base metal. It is also useful in a base metal comprising mainly iron and aluminum.

The principal object of the invention is to provide a process wherein a base metal is nitrided by the use of a very high frequency induction heating of the order of 10 to 2,000 kilocycles per second. The preferred temperature range for the nitriding operation is 900° to 3,000° F.

Another important object of the invention is to provide a process wherein the base metal is preliminarily heated to a high temperature by the use of very high frequency induction current so that all entrained, absorbed, or occluded gases and other volatile impurities are purged and cleansed from the metal base prior to the nitriding operation. This greatly increases the efficiency of the process.

After the metal base has thus been cleaned and purged, the metal surface to be nitrided is at a very high temperature, with its molecules in a high rate of vibration due to such high temperature. When in this condition, it is treated with nitrogen under pressure, preferably with ammonia gas, at pressures up to 300 lbs. per square inch. The ammonia is decomposed at such high temperature, thereby liberating nascent nitrogen which rapidly and thoroughly blends and combines with the purged, cleaned and chemically active surface of the base metal.

The result of this is that there is a homogeneous bond between the nitrogen and the metallic base, with no line of demarcation between the nitrided portion and the remainder of the metal base. The nitrided portion of the base metal is solid, is not porous in any sense and is very hard and wear resisting.

In one aspect of the invention the high frequency current, instead of being applied continuously for a designated period may be applied intermittently, with very satisfactory results.

Without restricting the invention to this example, the following is illustrative of the invention:

An iron cylinder, composed essentially of iron with small amounts of carbon, aluminum, molybdenum, manganese, silicon and chromium, was subjected in an appropriate induction furnace to a high frequency current of about 200 kilocycles for approximately ½ minute. This raised the surface temperature of the cylinder to about 2000 degrees F. and thereby cleansed and purged the surface from occluded or entrained gases and other volatile impurities. This operation was conducted at sub-atmospheric pressure of about 0.5 lb. absolute per square inch, this lowered pressure accelerating the escape of the volatile substances.

After the metal was thus cleaned and purged, and while still at a high temperature, with its molecules in rapid vibration due to the temperature, ammonia gas was admitted to the furnace under a pressure of about 120 lbs. and maintained during the heating cycle, the current frequency being maintained at 200 kilocycles (applied intermittently) and the surface temperature of the cylinder being maintained at about 2000 degrees F. for 75 minutes.

Repeated applications of the heating cycle gives a high surface temperature without necessarily heating the entire mass to the required elevated temperature.

The surface of the cylinder was thereby effectively nitrided, the nitriding effect being gradual, there being no line of demarcation between the nitrided and the deeper non-nitrided portions of the cylinder.

Further uses of the invention are shown in the accompanying drawing, wherein.

Figure 1:
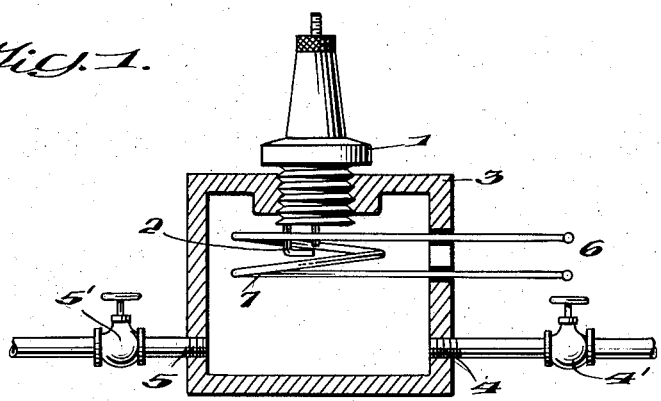
Fig. 1 is a diagrammatic vertical cross section of apparatus for nitriding a spark plug.

Referring to Fig. 1, spark plug 1 provided with the usual electrodes 2 is threaded into a furnace or heating chamber 3 provided with inlets and outlets 4 and 5 controlled by valves 4' and 5' respectively and with terminals 6 of a heating coil 7, surrounding the electrodes. Chamber 3 is preferably of non-conducting material. The leads to the coil are sealed air tight. By the application of a suitable vacuum pump, the pressure is lowered in the chamber 3 to about 0.02 lb. per square inch absolute to 14 lbs. per square inch absolute and at the same time high frequency current of about 10 to 2000 kilocycles is applied to the coil 7 which heats up the electrodes to about 1000 to 2800 degrees F., thereby cleaning and purging them of all volatile gases and impurities.

After this has been accomplished, ammonia gas is admitted at the inlet 4 at a pressure from atmospheric up to 100 or 200 lbs. per square inch, the temperature meanwhile being maintained at about 1500 degrees F. The ammonia is decomposed at this temperature, liberating nascent nitrogen, which readily combines with the metal. This treatment is continued for about 30 to 240 minutes. The electrodes are thereby effectively nitrided and hardened and their life substantially increased.

Figure 2:
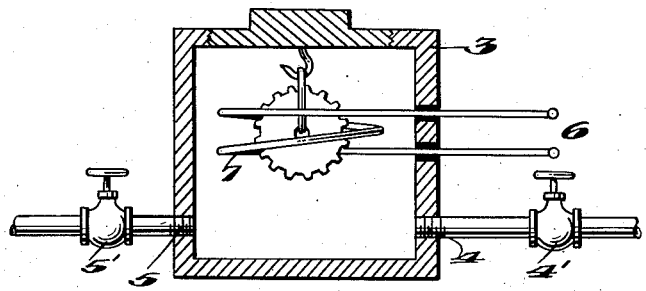
Fig. 2 is a similar cross section of apparatus for nitriding a gear wheel.

Fig. 2 shows an apparatus for nitriding a gear wheel or the like, supported within the heating coil 7.

While the invention has been described in some detail, it should be understood that the invention should not be limited to such details, but in its broader aspects may be carried out in other ways.

I claim as my invention:

1. A two-stage method of nitriding a ferrous base metal, comprising the steps of preliminarily subjecting the metal to high frequency induction heating, under a vacuum of about 0.5 lb. per square inch absolute, to a temperature of about 2000° F. for purging entrained, absorbed and occluded gases, and immediately, while the metal is still hot from such preliminary heating, treating the metal with gaseous ammonia at a pressure up to 300 lbs. per square inch, within a temperature range of 900°–3000° F.

2. A two-stage method of nitriding a ferrous base metal, comprising the steps of preliminarily subjecting the metal to high frequency induction heating, under a vacuum of about 0.5 lb. per square inch absolute, to a temperature of about 2000° F. for about one-half minute for purging entrained, absorbed and occluded gases, and immediately, while the metal is still hot from such preliminary heating, treating the metal with gaseous ammonia at a pressure of about 120 lbs per square inch, for about 75 minutes.

LEON G. DUFILHO.

REFERENCES CITED

The following references are of record in the file of this patent:

UNITED STATES PATENTS

| Number | Name | Date |
| --- | --- | --- |
| 1,726,431 | Fourment | Aug. 27, 1929 |
| 1,907,183 | Kinzel | May 2, 1933 |
| 1,916,015 | Pawlek | June 27, 1933 |
| 1,930,388 | Hatfield | Oct. 10, 1933 |
| 2,012,039 | Eitel et al. | Aug. 20, 1935 |
| 2,172,428 | Wulff et al. | Sept. 12, 1939 |